United States Patent [19]

Natsuhori

[11] Patent Number: 5,648,861
[45] Date of Patent: Jul. 15, 1997

[54] SPATIAL LIGHT MODULATOR HAVING A GERMANIUM OXIDE LIGHT SHIELDING LAYER CONTAINING ADDITIVE MATERIAL OR LAMINATED WITH $SIO_2$

[75] Inventor: Hiroyuki Natsuhori, Kamakura, Japan

[73] Assignee: Victor Company of Japan, Ltd., Yokohama, Japan

[21] Appl. No.: 595,029

[22] Filed: Jan. 31, 1996

[30] Foreign Application Priority Data

Jan. 31, 1995 [JP] Japan .................................. 7-034400

[51] Int. Cl.$^6$ .............................. G02F 1/1333; G02F 1/133
[52] U.S. Cl. .......................................... 349/116; 349/110
[58] Field of Search .......................................... 359/67, 72

[56] References Cited

U.S. PATENT DOCUMENTS

| | | |
|---|---|---|
| 4,799,773 | 1/1989 | Sterling . |
| 5,155,609 | 10/1992 | Konno et al. . |
| 5,196,702 | 3/1993 | Tsuji et al. ................................. 250/327 |
| 5,233,265 | 8/1993 | Takasaki et al. ........................ 313/366 |
| 5,268,799 | 12/1993 | Shigeta et al. . |
| 5,515,411 | 5/1996 | Tonami et al. ............................ 378/98 |

OTHER PUBLICATIONS

Applied Physics Letters 22(3) 90–92 (Feb. 1973) "ac liquid-crystal light valve:", Beard, T.D., et al.
SID 86 Digest, pp. 379–382 (1986) Ledebuhr, A.G., "Full Color Single-Projection Lens—".

Primary Examiner—William L. Sikes
Assistant Examiner—Julie Ngo
Attorney, Agent, or Firm—Michael N. Meller

[57] ABSTRACT

The present invention provides a spatial light modulator having a light shielding layer having a high resistivity and a high light shielding characteristic capable of improving a contrast ratio without causing image defects. The spatial light modulator has at least a first transparent electrode 14, a photoconductive layer 18, a light shielding layer 12, a light reflecting layer 11, a photomodulation layer 10, and a second transparent electrode 16 stacked in this order. A driving power source 18 is connected across the pair of the transparent electrodes. the light shielding layer is made of a germanium oxide containing an amount of oxygen from 25 to 50 at % or a germanium oxide containing at least one additive selected from a group consisting of Cu, Ag, Au, Fe, Co and Ni within 20 at % defined as an atomic ratio of the additive to a combination of the additive and germanium. Further, a laminated structure composed of germanium oxide layers and $SiO_2$ layers are adopted as the light shielding layer.

7 Claims, 3 Drawing Sheets

SPATIAL LIGHT MODULATOR HAVING A GERMANIUM OXIDE LIGHT SHIELDING LAYER CONTAINING ADDITIVE MATERIAL OR LAMINATED WITH SIO₂

BACKGROUND OF THE INVENTION

1. Field of the Invention

This invention relates to improvements of image display quality and productivity of a spatial light modulator to be used on flat panel displays, optical operation elements and video projectors.

2. Description of the Related Arts

As well known, it is possible to perform an incoherent-coherent light conversion or a reverse operation thereof by using a spatial light modulator. Thus, as applications of the spatial light modulator, there are considered a parallel data processing and a direct image processing. Further, the spatial light modulator is applicable to a display system of the video projector by amplifying an intensity of the light beam.

FIG. 1 is a sectional side view of a spatial light modulator of the present invention.

At first, a description is given of an outline of the spatial light modulator 1 in reference to FIG. 1.

Generally, a spatial light modulator 1 has a writing side having a photoconductive layer 13 where a writing light beam of an image is inputted, and a reading side having a photomodulation layer 10 made of a liquid crystal layer as a modulation material where a reading light beam is inputted to read out the image recorded on the photoconductive layer 13. The reading side and the writing side are optically shielded to each other by a light shielding layer 12 so as to prevent the reading light beam from invading the writing side.

Specifically, the spatial light modulator 1 comprises a glass substrate 15, a transparent electrode 14, the photoconductive layer 13, the light shielding layer 12, a reflecting layer or a dielectric mirror 11, the photomodulation layer 10, a transparent electrode 16 and a glass substrate 17 stacked in this order, and a driving power source 18 is connected between the transparent electrodes 14, 16.

Next, a description is given to the operation of the spatial light modulator 1.

The writing light beam carrying desired information is inputted into the photoconductive layer 13 in a direction of an arrow F1 through the glass substrate 15 and the transparent electrode 14. In the photoconductive layer 13, the impedance of the photoconductive layer 13 is changed in accordance with the intensity distribution of the writing light beam, so that the photoconductive layer 13 has a conductive distribution corresponding to the intensity distribution of the writing light beam as it scans the photoconductive layer 13. Thus, the voltage from the driving power source 18 is applied to the photoconductive layer 13 correspondingly with the conductive distribution, i.e., a two dimensional intensity distribution of the writing light beam. At that time, the arrangement of the liquid crystal molecules in the photomodulation layer 10 is also changed correspondingly with an electric field distribution applied to the photomodulation layer 10 caused by the conductive distribution of the photoconductive layer 13.

On the other hand, the reading light beam is inputted into the photomodulation layer 10 in a direction of an arrow F2 through the glass substrate 17 and the transparent electrode 16. Thus, the reading light beam is modulated correspondingly with the electric field distribution in the photomodulation layer 10. The reading light beam modulated is reflected by the dielectric mirror 11, and is outputted in a direction of an arrow F3. Incidentally, when a crystal or a liquid crystal supported by a support (for instance, a liquid crystal film) is employed as the photomodulation layer 10, the glass substrates 15, 17 or one of them may be omitted.

As mentioned in the foregoing, the light shielding layer 12 is used for preventing the reading light beam from invading the photoconductive layer 13 through the dielectric mirror 11 and from disturbing the image charge recorded in the photoconductive layer 13, otherwise the contrast ratio and resolution of the image read out will be degraded.

When the spatial light modulator 1 is employed in the video projector, the leakage light beam from the reading light beam will cause an adverse effect in the image quality, in particular, when the photoconductive layer 13 which has a high sensitivity to the wavelength of the leakage light beam, is employed in the spatial light modulator 1, the leakage light beam causes not only degradations of the contrast ratio and resolution of the image displayed but also image dropout thereof.

Generally, in order to avoid the problems mentioned above, the light shielding layer 12 is employed, but, it is preferable to form the light shielding layer 12 by using a material having a high electrical resistivity to prevent the degradation of the resolution of the image caused by the light shielding layer 12 itself.

However, such a material having both a high electrical resistivity and a high light blocking function, is not easily available.

As seen in Japanese Patent Laid-Open Publication of H2-501334/90, a material of CdTe is used as the light shielding layer, but the material of CdTe has the problems of high cost and toxicity. Further, the material has a drawback of poor adhesion, thus it requires intermediate layers to enhance adhesion between the shielding layer and the photoconductive layer and between the shielding layer and the reflecting layer. This causes a complex structure of the spatial light modulator, so that a possibility of generating defects of the spatial light modulator increases in the production process.

SUMMARY OF THE INVENTION

Accordingly, a general object of the present invention is to provide a spatial light modulator in which the above disadvantages have been eliminated.

A more specific object of the present invention is to provide a spatial light modulator having a light shielding layer made of a low cost material having a high electrical resistivity and an excellent light shielding characteristic capable of improving the contrast ratio and resolution of an image without causing image defects.

Another and more specific object of the present invention is to provide a spatial light modulator comprising: a first transparent electrode; a photoconductive layer formed on the first transparent electrode; a light shielding layer formed on the photoconductive layer, the light shielding layer being made of a germanium oxide including oxygen from 25 to 50 at % which is defined as an atomic ratio of oxygen to the germanium oxide; a light reflecting layer formed on the light shielding layer; a photomodulation layer formed on the light reflecting layer; and a second transparent electrode formed on the photomodulation layer.

Another and more specific object of the present invention is to provide a spatial light modulator comprising: a first transparent electrode; a photoconductive layer formed on the first transparent electrode; a light shielding layer formed on the photoconductive layer, the light shielding layer being made of a germanium oxide including at least one additive selected from a group consisting of Cu, Ag, Au, Fe, Co and Ni within 20 at % which is defined as an atomic ratio of the additive selected from the group to a combination of the additive and germanium; a light reflecting layer formed on the light shielding layer; a photomodulation layer formed on the light reflecting layer; and a second transparent electrode formed on the photomodulation layer.

Another and more specific object of the present invention is to provide a spatial light modulator comprising a first transparent electrode; a photoconductive layer formed on the first transparent electrode; a light shielding layer formed on the photoconductive layer, the light shielding layer having a laminated structure composed of a germanium oxide layer and a $SiO_2$ layer; a light reflecting layer formed on the light shielding layer; a photomodulation layer formed on the light reflecting layer; and a second transparent electrode formed on the photomodulation layer.

Other objects and further features of the present invention will be apparent from the following detailed description.

DETAILED DESCRIPTION OF THE PREFERRED EMBODIMENTS

Figure 1:
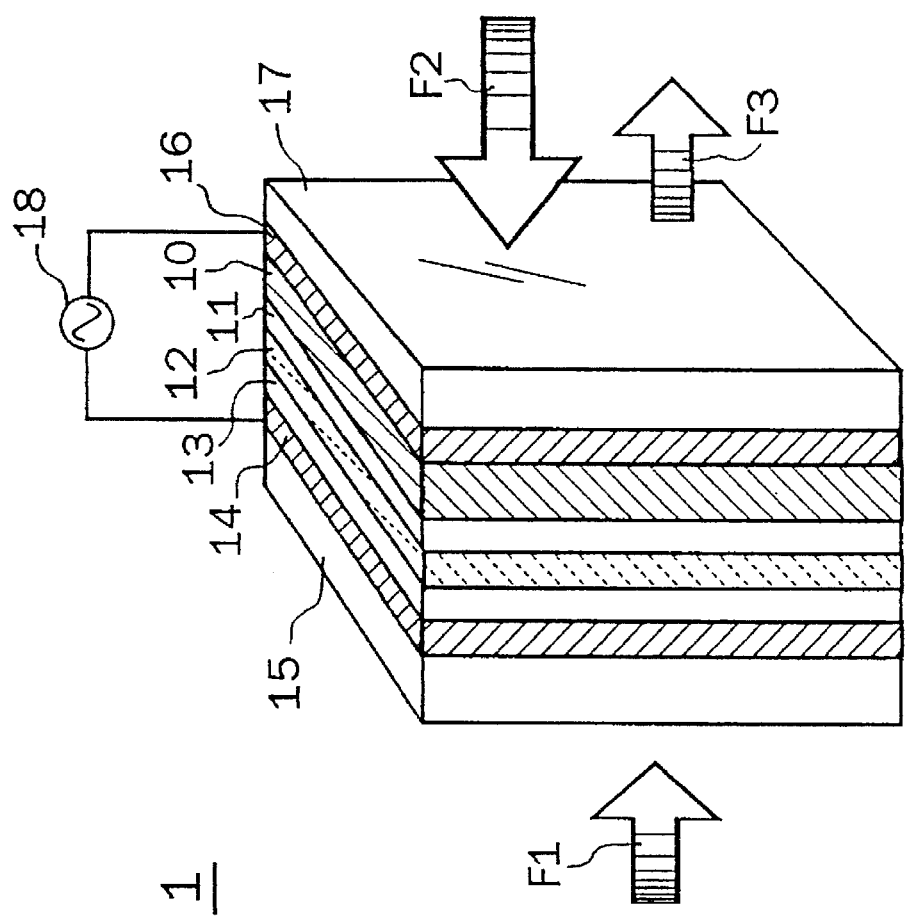
FIG. 1 is a sectional side view of a spatial light modulator for use in the present invention.

A description is now given of an embodiment of a spatial light modulator of the present invention with reference to FIG. 1.

As mentioned in the prior art, the spatial light modulator i used in the present invention comprises the glass substrate 15, the transparent electrode 14, the photoconductive layer 13, the light shielding layer 12, the dielectric mirror (reflecting layer) 11, the photomodulation layer 10, the transparent electrode 16 and the glass substrate 17 stacked in this order, and the driving power source 18 is connected between the transparent electrodes 14, 16. The operation of the spatial light modulator has been explained in the prior art, thus it is omitted here for simplicity.

At first, there is described a manufacturing method of a germanium oxide layer used as the light shielding layer 12.

A thin film of a germanium oxide is formed or deposited by sputtering germanium (Ge) of 5 N (99.999) as a target with argon (Ar) ion in an ion-beam sputtering device.

At that time, a desired amorphous germanium oxide thin film is obtained by introducing a predetermined amount of oxygen ($O_2$) gas into the ion-beam sputtering device.

The deposition conditions are as follows:

flow rate of Ar gas: 10 sccm (standard cc/min)

acceleration voltage of Ar ion: 1 kV substrate temperature: 120° C.

deposition speed: 8 angstrom/sec at 120° C.

Figure 2A:
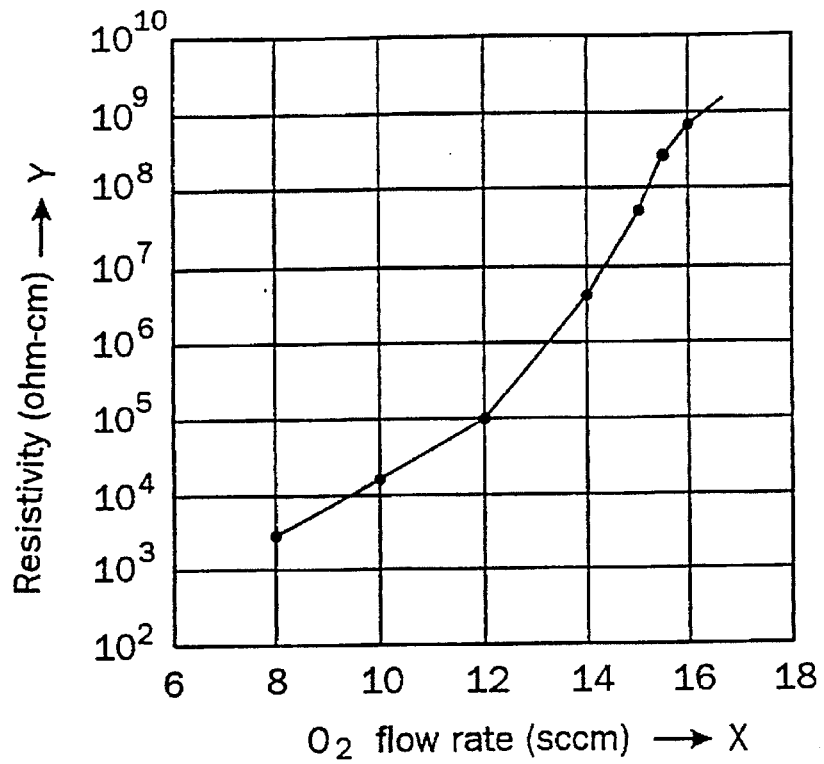
FIG. 2(A) is a graph showing a relation between a resistivity of $GeO_x$ (oxide) and an $O_2$ flow rate.

FIG. 2(A) is a graph showing a relation between a resistivity of $GeO_x$ (oxide) and an $O_2$ flow rate.

Figure 2B:
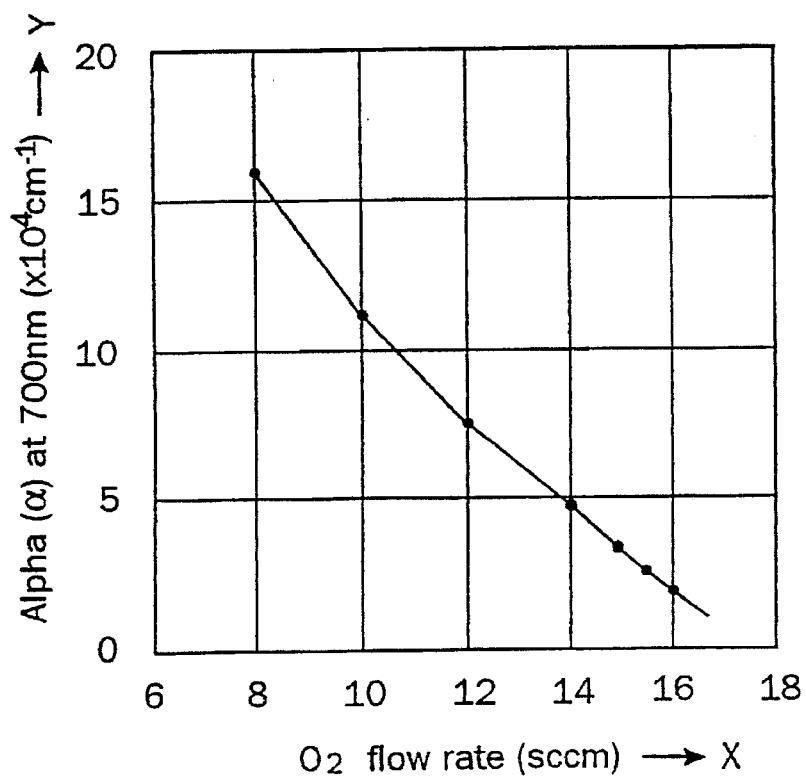
FIG. 2(B) is a graph showing a relation between a light absorption coefficient of $GeO_x$ and an $O_2$ flow rate.

FIG. 2(B) is a graph showing a relation between a light absorption coefficient ($\alpha$) of $GeO_x$ and an $O_2$ flow rate.

In FIGS. 2(A) and 2(B), the X axis designates a flow rate (sccm) of oxygen ($O_2$) introduced in the device and the Y axis designates a resistivity (ohm-cm) of $GeO_x$ (germanium oxide) (FIG. 2(A)) and a light absorption coefficient ($\alpha$) of $GeO_x$ (FIG. 2(B)), respectively.

Generally, a semiconductor thin layer tends to absorb a more light beam having a shorter wavelength compared with one having a longer wavelength. Thus, light absorption coefficients ($\alpha$) of materials used as the light shielding layer 12 were evaluated by using the light beam having a wavelength of 700 nm which was absorbed least by the materials within a visible wavelength range from 400 nm to 700 nm.

As seen from FIGS. 2(A) and (2B), the larger the flow rate of $O_2$, the larger the resistivity of the $GeO_x$, on the contrary, the smaller the absorption of coefficient ($\alpha$).

It is desirable for the light shielding layer 12 that the absorption coefficient ($\alpha$) is much larger, however, in that case, the resistivity thereof may not be satisfied. The decrease of the resistivity of the light shielding layer 12 causes a degradation of the resolution of the image. Thus, they are contradictive to each other.

In order not to degrade the resolution, the resistivity thereof has to be not less than $1 \times 10^6$ $\Omega$-cm, preferably not less than $1 \times 10^7$ $\Omega$-cm, most suitably not less than $1 \times 10^8$ $\Omega$-cm.

On the other hand, optical density (referred to as O.D.) presenting a light shielding characteristic of the light shielding layer 12 is calculated according to a formula (1) as follows.

$$O.D. = -Log((1-R)exp(-\alpha \times d)) \quad (1)$$

Wherein $\alpha$: an absorption coefficient, d: a thickness of the layer and R: a reflection factor of the surface of the light shielding layer 12.

The value of O.D. required for the light shielding layer 12 is determined from intensities of the writing and reading light beams and a photosensitivity of the photoconductive layer 13 of the spatial light modulator 1. When the spatial light modulator 1 is applied to a video projector, the reading light beam requires an intensity of 1,000 to 10,000 times as much as that of the writing light beam. Further, as a high speed response photoconductive layer 13 capable of processing moving images, a hydrogenated amorphous silicon is used. This hydrogenated amorphous silicon has a high wavelength sensitivity at the wavelength of 700 nm. Thus, the light beam of the wavelength of 700 nm is usually used as the writing light beam.

In order to suppress an amount of the leakage light beam from the reading light beam to be not more than 1/10 of the writing light beam, the value of the O.D has to be about 4 to 5. This is obtained by using the formula (1), taking account of the above conditions. The reading light beam of not less than 90% is reflected by the light shielding layer 12, thus, the value of the O.D has to be about 3 to 4 in the light shielding layer 12.

Table 1 shows experimental results regarding amounts (at % of oxygen contained in amorphous germanium oxide of a thin layer (2 μm), absorption coefficients (α(cm$^{-1}$) and values of O.D corresponding to resistivities (Re) of the respective thin layers.

TABLE 1

| Re. (Ω-cm) | oxygen (at %) | α (cm$^{-1}$) | O.D. (700 nm) |
|---|---|---|---|
| 1 × 10$^6$ | 28 | 5.5 × 10$^4$ | 4.9 |
| 1 × 10$^7$ | 34 | 3.8 × 10$^4$ | 3.4 |
| 1 × 10$^8$ | 40 | 2.3 × 10$^4$ | 2.1 |
| 1 × 10$^9$ | 44 | 1.7 × 10$^4$ | 1.6 |

For instance, when the resistivity (Re.) is made to be 1 ×10$^7$ (Ω-cm), the value of O.D. becomes 3.4 under the conditions of a thin film thickness of 2 μm, α=3.8×10$^4$ (cm$^{-1}$), and the oxygen amount of 34 (at %). Thus, both the high resistivity and the high light shielding characteristic are realized.

As seen from Table 1, when the resistivity is made larger, the value of the O.D. becomes smaller. However, the value of the O.D. will be improved by increasing the thickness of the thin layer. For example, when the resistivity is made 1×10$^2$ (Ω-cm), the necessary value (about 3) of the O.D. is obtained by causing the thickness of the thin layer to be about 4 μm. A larger thickness of the thin layer is not desirable in view of the resolution, however, the thickness of about 4 μm thereof has no problem to the resolution characteristic.

Incidentally, the amount of the oxygen contained in the thin layer is measured by using XPS (X-ray photoelectron spectroscopy), and is defined as an atomic ratio (at %) of oxygen to the amorphous germanium oxide of the thin layer. The values of the oxygen obtained are considered to include an error within a range of 10%.

As a result of the above, it can be said that as long as the atomic ratio of oxygen included in the amorphous germanium oxide of the thin layer is made to be 25 to 50 at %, the amorphous germanium oxide thin layer satisfies both the high resistivity and the high light shielding characteristic as the light shielding layer 12.

Further, the amorphous germanium oxide thin layer has another feature that it requires no intermediate layer interposed between an under layer and itself because of its excellent adhesion. Furthermore, a membrane stress of the thin layer is as small as 1×10$^9$ dyn/cm$^2$, and the mean surface roughness (Ra) thereof is about 0.2 nm without extraordinary growth and projections.

Next, a description is given of a method for improving the resistivity and the light absorption of the germanium oxide.

Generally, the characteristics of the semiconductor can be controlled by adding impurities.

Impurities added to and forming a deep level in the semiconductor, cause to increase resistivity and light absorption of such impurity added semiconductor material.

As the impurities forming deep levels in germanium, there are Cu, Ag, Au, Fe, Co and Ni.

It is possible to improve the light shielding characteristics by adding one or more elements selected from the group consisting of Cu, Ag, Au, Fe, Co and Ni to the amorphous germanium oxide.

Upon adding the impurity elements, some of the chips made of these impurity elements were placed on the germanium target, or a germanium target containing predetermined amounts of the impurity elements was used. Other processes were performed in the same way as mentioned in the foregoing.

Figure 3A:
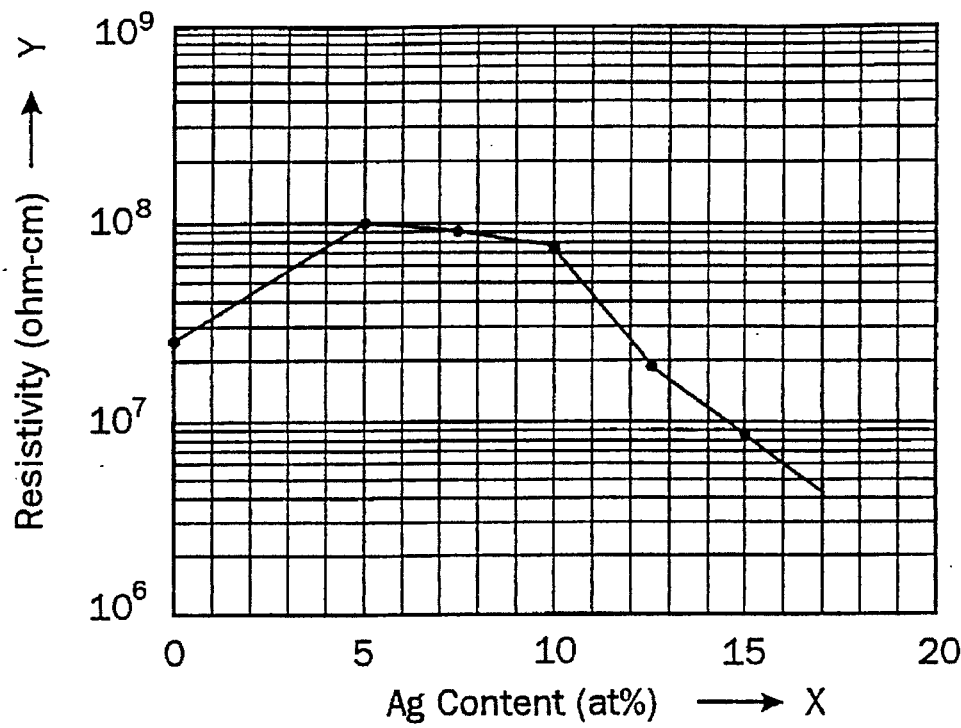
FIG. 3(A) is a graph showing a relation between an atomic ratio (ate) of Ag additive to a combination of Ag additive and germanium in a thin film and a resistivity of the thin film.

FIG. 3(A) is a graph showing a relation between an atomic ratio (at %) of an Ag additive to a combination of the Ag additive and germanium in the thin layer and the resistivity of the thin film.

Figure 3B:
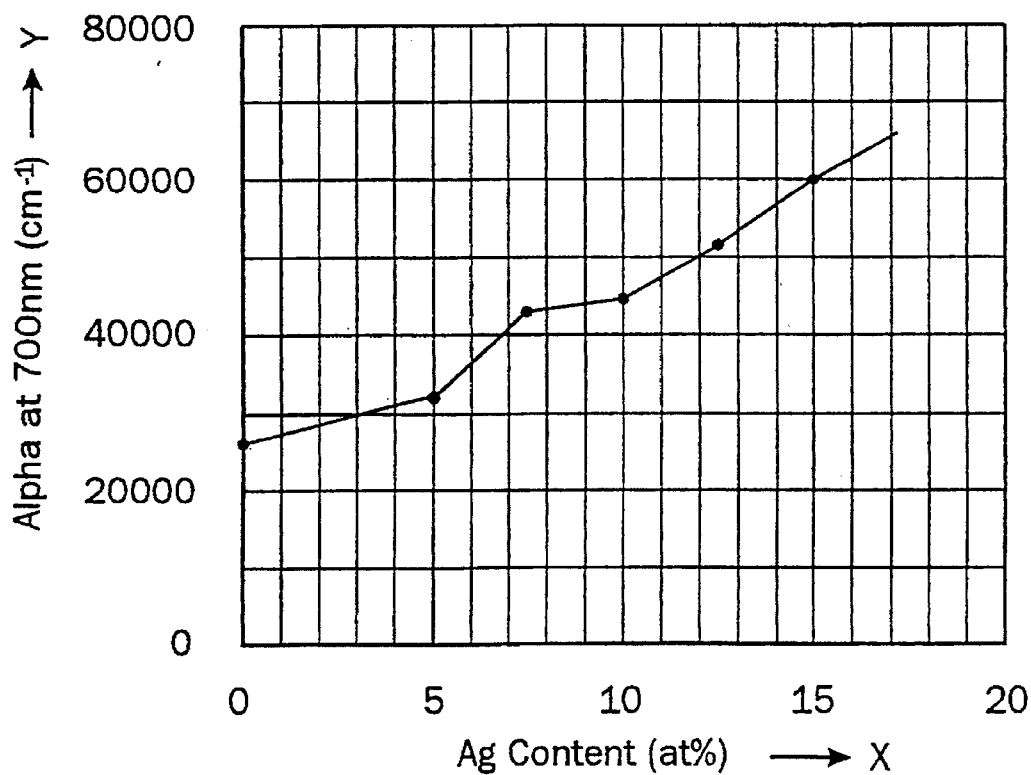
FIG. 3(B) is a graph showing a relation between an atomic ratio (ate) of Ag additive to a combination of the Ag additive and germanium and an absorption coefficient ($\alpha$) of the thin film.

FIG. 3(B) is a graph showing a relation between an atomic ratio (at %) of an Ag additive to a combination of the Ag additive and germanium and a absorption coefficient (α) of the thin film.

In FIGS. 3(A) and 3(B), the X axis designates an atomic ratio (at %) of Ag additive contained in a combination of the Ag additive and germanium, and the Y axis designates a resistivity of the thin layer (FIG. 3(A)) and an absorption coefficient (α) of the thin film (FIG. 3(B)), respectively.

The amount of Ag additive was quantitatively measured by using an XMA (electron probe X-ray microanalyzer) and is defied as an atomic ratio of the Ag additive to a combination of the Ag additive and germanium.

Referring to FIGS. 3(A) and 3(B), it can be understood that within an atomic ratio of not more than 5 at % of the AK additive, both the resistivity and the absorption coefficient (α) of the thin film are increased and show a desirable characteristic as the light shielding layer 12. A further amount of Ag additive decreases the resistivity thereof, but increases the absorption coefficient (α). Thus, it is possible to obtain the thin layer having more excellent characteristics than one having no Ag additive as long as an amount of AK additive is not more than 20 at % in the combination of the Ag additive and germanium.

TABLE 2

| additive | Re. (Ω-cm) | α (cm$^{-1}$) | O.D. (700 nm) |
|---|---|---|---|
| none | 1 × 10$^7$ | 3.8 × 10$^4$ | 2.6 |
| Ag additive | 1 × 10$^7$ | 5.8 × 10$^4$ | 3.9 |
| Cu additive | 1 × 10$^7$ | 5.3 × 10$^4$ | 3.6 |
| Co additive | 1 × 10$^7$ | 4.4 × 10$^4$ | 3.0 |

Table 2 shows experimental results of the absorption coefficients (α) and the O.D. of four samples of thin layers added with no additive, Ag additive, Cu additive and Co additive within an amount of 20 at %, wherein the amount of the additive is defied as an atomic ratio (at %) of the additive to a combination of the additive and germanium in the respective thin layer. The amount of the oxygen (at %) was controlled so that the resistivity (Re) of the respective samples became to be 1×10$^7$ (Ω-cm). (The amounts of the oxygen required were respectively 28 at % for the Ag additive sample, 29 at % for the Cu additive sample and 32 at % for the Co additive sample.)

Each value of the O.Ds of the thin layers is calculated by using thickness of 1.5 μm which is thinner than those (2 μm) of the thin layers shown in Table 1. It should be noted that all the samples except for the one having no additive show excellent values of not less than 3. This suggests excellent light shielding characteristics of them.

Further, it is confirmed that other than mentioned above, such additives as Au, Fe and Ni can be employed. Each of the samples containing the additives of Au, Fe and Ni showed also excellent light shielding characteristics within a total amount of about 20 at % as well. Thus, it should be noted that in present invention, the germanium oxide of the thin layer includes at least one additive selected from a group consisting of Cu, Ag, Au, Fe, Co and Ni within a total amount of 20 at % which is defined as the atomic ratio (ate) of the additive to the combination of the additive and germanium in the thin layer.

At that time, oxygen is contained in the respective thin layers in a preferable range of 25 to 50 at % to the germanium oxide including the additive as mentioned in the foregoing.

When the light shielding layer 12 is formed with a semiconductor, the value of the O.D. of the thin layer becomes smaller in a range of long wavelength compared with in a range of short wavelength, as mentioned in the foregoing. As a simple countermeasure, it may be considered to make the thickness of the thin layer further thicker. However, this is undesirable in the view of resolution of the image as mentioned in the foregoing.

In the present invention, in order to improve the O.D. of the light shielding layer 12 in the range of long wavelength, a laminated structure is employed in the light shielding layer 12 by laminating amorphous germanium oxide thin layers and silicon oxide ($SiO_2$).

The laminating of the light shielding layer 12 is performed by using ion-beam sputtering in the same manner as described in the samples with reference to Table 1. The $SiO_2$ thin layers are formed by sputtering $SiO_2$ used as a target with Ar-ion in an oxygen atmosphere.

Specifically, at first, an amorphous germanium oxide thin layer having a thickness of 1 μm is formed to improve the light shielding characteristic in the range of short wavelength. Then, on top of the above thine layer of 1 μm, five sheets of amorphous germanium oxide layers and five sheets of $SiO_2$ layers are alternately laminated each other so that each $SiO_2$ layer is interposed between amorphous germanium oxide layers in which each layer has an optical thickness (n×d: n is an index of refraction) of λ/4 (λ: a center wavelength=700 nm).

As a result, the light shielding layer 12 having the laminated structure composed of the $SiO_2$ layers and the the amorphous germanium oxide layers each having the resistivity of $1×10^8$ Ω-cm (amount of oxygen of 40 at %) and the absorption coefficients (α) of $2.3×10^4$ $cm^{-1}$ as recited in Table 1 showed the value of O.D. of more than 3 in the overall range of visible wavelength even when a total thickness of the light shielding layer 12 was as thin as 1.9

As seen from Table 3, in order to obtain the value of O.D. of more than 3 (λ=700 nm) by using a sole amorphous germanium oxide layer, the thickness of the light shielding layer 12 has to be more than 3 μm. Thus, it is possible to obtain a necessary light shielding characteristic with the thinner thickness of 1.9 μm by making the laminated structure have a center wavelength of its shielding characteristic in the long range.

Incidentally, when the reading light beam contains only the range of short wavelength or the photoconductive layer 13 has a high sensitivity in the range of shorter wavelength, it is possible to reduce the thickness of the light shielding layer 12 correspondingly therewith.

Next, a description is given of the embodiments 1 to 3 of the special light modulator 1 employing the amorphous germanium oxide layer and a comparative of the spatial light modulator of the prior art which employs a CdTe layer as the light shielding layer 12

First, on the transparent electrode 14 formed on the glass substrate 15, a hydrogenated amorphous silicon photoconductive layer 13 was formed by the plasma CVD (chemical vapor deposition method) under the conditions of silane gas ($SiH_4$) of 15 sccm, hydrogen gas ($H_2$) of 60 sccm, substrate temperature of 200° C., and electric power density of 60 $mW/cm^2$.

The specifications of the light shielding layer 12 for the embodiments 1 to 3 and the comparative were as follows:
Embodiment 1:
  material and structure; amorphous germanium oxide (corresponds to the sample of an amount of oxygen of 34 shown in Table 1)
  resistivity (Re); $1×10^7$ Ω-cm
  thickness; 2 μm
Embodiment 2:
  material and structure; amorphous germanium oxide including Ag additive (corresponds to the sample including Ag additive shown in Table 1)
  resistivity (Re); $1×10^7$ Ω-cm
  thickness; 1.5 μm
Embodiment 3:
  material and structure; this embodiment has the laminated structure. On an amorphous germanium oxide thin layer having resistivity of $1×10^8$ and a thickness of 1 μm mentioned above, five sheets of amorphous germanium oxide layers and five sheets of $SiO_2$ layer were alternately laminated each other so that each layer is interposed between other material layers on the above thin layer of 1 μm so that each of them has an optical thickness (n×d: n is an index of refraction) of λ/4 (λ=700 nm).
Comparative:
  material and structure; CdTe (formed by an RF (radio frequency) sputtering apparatus, O.D.=3.2)
  resistivity (Re); $5×10^6$ Ω-cm
  thickness; 2.0 μm On each of these light shielding layers 12 of the embodiments 1 to 3 and the comparative, the dielectric mirrors 11 were formed by alternately laminating 6 $SiO_2$ layers and 6 $TiO_2$ layers so that each layer is interposed between other material layers.

After forming another transparent electrode 16 on another glass substrate 17 and conducting homeotropic orientation process for producing the liquid crystal with respect to the embodiments 1 to 3 and the comparative, both the glass substrates 15 and the another glass substrate 17 were coupled to each other with a spacer interposed therebetween so as to form a cell between the dielectric mirror 11 and the another transparent electrode 16. Thus, the spatial light modulators of the embodiments 1 to 3 and the comparative were obtained by filling the cells with the liquid crystal as the photomodulation layer 10.

Each of these spatial light modulators of the embodiments 1 to 3 and the comparative was operated by applying an alternative voltage of driving frequency of 2 KHz across the transparent electrodes 14, 16, and writing an image with a writing light beam of wavelength of 700 nm, and reading out the image with a reading light beam of red color which was obtained from a xenon lamp through a three color separation device. The results is shown in Table 3.

TABLE 3

|  | contrast | im. defect | resol.(lines/mm) |
| --- | --- | --- | --- |
| embod. 1 | 100:1 | none | 60 |
| embod. 2 | 100:1 | none | 80 |
| embod. 3 | 100:1 | a few | 80 |
| comparative | 100:1 | many | 40 |

As seen from Table 3, all the embodiments 1–3 and the comparative showed an excellent contrast as they satisfy the required light shielding characteristics.

However, in the comparative, many image defects caused by the CdTe layer were found out. The embodiments 2 and 3 showed excellent resolutions because of high resistivity (Re) and thin layer of the light shielding layer 12.

In the present invention, various changes and modification may be made without departing from the scope of the invention. In the above light shielding layer 12, the required O.D. value changes depending on the intensity of the reading light beam. In that case, the specification of the light shielding layer 12 may be optionally changed.

Further, in the manufacturing method of the light shielding layer 12, the ion-sputtering method is employed, however, DC sputtering, RF sputtering, ion-sputtering and ion-plating methods are also applicable.

Further, the laminating number of the amorphous germanium oxide layer and the $SiO_2$ layer, and the center wave-length X can be optionally changed.

According to the spatial light modulator of the present invention, there are advantages as follows:

(1) It is possible to obtain an image having excellent contrast and resolution without causing image defects by employing the germanium oxide thin layer as the light shielding layer 12, which contains an amount of oxygen of 25 to 50 at % defined as an atomic ratio of oxygen to the germanium oxide.

(2) It is possible to increase further the light shielding characteristic of the light shielding layer 12 by adding at least one additive selected from a group consisting of Cu, Ag, Au, Fe, Co and Ni to the germanium oxide within a total amount of 20 at % which is defined as an atomic ratio of the additive to an combination of the additive and germanium. This enables to decrease the thickness of the light shielding layer 12, resulting in a high resolution of the image and high productivity of the spatial light modulator.

(3) It is possible to increase the light shielding characteristic of the light shielding layer 12 at the range of long wavelength by causing the light shielding layer 12 to have a laminated structure composed of germanium oxide layers and $SiO_2$ layers, resulting in a decrease of thickness of the light shielding layer 12, thus a high resolution of the image can be obtained.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A spatial light modulator comprising:

a first transparent electrode;

a photoconductive layer formed on the first transparent electrode;

a light shielding layer formed on the photoconductive layer, the light shielding layer being made of a germanium oxide containing oxygen from 25 to 50 at % which is defined as an atomic ratio of oxygen to the germanium oxide;

a light reflecting layer formed on the light shielding layer;

a photomodulation layer formed on the light reflecting layer; and a second transparent electrode formed on the photomodulation layer.

2. A spatial light modulator comprising:

a first transparent electrode;

a photoconductive layer formed on the first transparent electrode;

a light shielding layer formed on the photoconductive layer, the light shielding layer being made of a germanium oxide containing at least one additive selected from a group consisting of Cu, Ag, Au, Fe, Co and Ni within 20 at % which is defined as an atomic ratio of the additive selected from the group to a combination of the additive and germanium;

a light reflecting layer formed on the light shielding layer;

a photomodulation layer formed on the light reflecting layer; and a second transparent electrode formed on the photomodulation layer.

3. A spatial light modulator as claimed in claim 2, wherein the germanium oxide contains an amount of oxygen from 25 to 50 at % which is defined as an atomic ratio of oxygen to the germanium oxide.

4. A spatial light modulator comprising:

a first transparent electrode;

a photoconductive layer formed on the first transparent electrode;

a light shielding layer formed on the photoconductive layer, the light shielding layer having a laminated structure composed of a germanium oxide layer and an $SiO_2$ layer;

a light reflecting layer formed on the light shielding layer;

a photomodulation layer formed on the light reflecting layer; and a second transparent electrode formed on the photomodulation layer.

5. A spatial light modulator as claimed in claim 4, wherein the germanium oxide layer containing at least an additive selected from a group consisting of Cu, Ag, Au, Fe, Co and Ni within 20 at % which is defined as an atomic ratio of the additive to a combination of the additive and germanium.

6. A spatial light modulator as claimed in claim 5, wherein the germanium oxide contains an amount of oxygen from 25 to 50 at % which is defined as an atomic ratio of oxygen to the germanium oxide.

7. A spatial light modulator as claimed in claim 4, wherein the germanium oxide contains an amount of oxygen from 25 to 50 at % which is defined as an atomic ratio of oxygen to the germanium oxide.

* * * * *